US006954352B2

(12) United States Patent
Kuo

(10) Patent No.: US 6,954,352 B2
(45) Date of Patent: Oct. 11, 2005

(54) LCD PANEL AND NOTEBOOK COMPUTER INCORPORATING THE SAME

(75) Inventor: Yan-Lin Kuo, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 216 days.

(21) Appl. No.: 10/458,180

(22) Filed: Jun. 11, 2003

(65) Prior Publication Data

US 2004/0160737 A1 Aug. 19, 2004

(30) Foreign Application Priority Data

Oct. 3, 2002 (TW) ........................................ 91122898 A

(51) Int. Cl.⁷ ................................................ G06F 1/16
(52) U.S. Cl. ...................... 361/681; 361/683; 248/917; 348/552
(58) Field of Search ................................ 361/681, 682, 361/683, 680, 686, 724–727; 248/161, 917–923, 157, 429, 346.03, 346.04; 345/204, 169, 905, 903; 235/462.36; 348/552; 349/58; 362/23, 31, 551, 561, 500, 541, 559; 312/223.2

(56) References Cited

U.S. PATENT DOCUMENTS

| | | | |
|---|---|---|---|
| 5,283,862 A | | 2/1994 | Lund |
| 5,600,580 A | * | 2/1997 | Honjo et al. ................. 361/681 |
| 5,796,576 A | * | 8/1998 | Kim ............................ 361/681 |
| 5,805,415 A | * | 9/1998 | Tran et al. ................... 361/681 |
| 6,006,243 A | * | 12/1999 | Karidis ....................... 708/100 |
| 6,118,663 A | * | 9/2000 | Fan ............................. 361/725 |
| 6,195,254 B1 | * | 2/2001 | Chang ......................... 361/681 |
| 6,437,973 B1 | * | 8/2002 | Helot et al. ................. 361/681 |
| 6,445,385 B1 | * | 9/2002 | Shin et al. ................... 345/204 |
| 6,788,530 B2 | * | 9/2004 | Hill et al. .................... 361/683 |
| 2001/0009500 A1 | | 7/2001 | Selker |
| 2002/0186202 A1 | | 12/2002 | Huang |

FOREIGN PATENT DOCUMENTS

| | | | | |
|---|---|---|---|---|
| JP | 2000099197 A | * | 4/2000 | ............. G06F/1/16 |
| TW | 475985 | | 2/2002 | |

* cited by examiner

Primary Examiner—Michael Datskovskiy
(74) Attorney, Agent, or Firm—Winston Hsu

(57) ABSTRACT

A LCD panel and a notebook computer incorporating the same is provided wherein the notebook computer includes a host, a rotating assembly, and a display panel body. The display panel body includes a first connecting unit, and the rotating assembly is detachably mounted on the host and having a second connecting unit exposed to an exterior of the rotating assembly. The second connecting unit is corresponding to the first connecting unit, and the rotating assembly is electrically connected with the host by an electric connection between the first connecting unit and the second connecting unit, so that the display panel body is rotatably connected with the rotating assembly.

15 Claims, 4 Drawing Sheets

LCD PANEL AND NOTEBOOK COMPUTER
INCORPORATING THE SAME

FIELD OF THE INVENTION

The present invention is related to a LCD panel and a notebook computer incorporating the same, and more particularly to a notebook computer wherein the LCD panel thereof can be rapidly assembled/disassembled and used independently of the rest of the notebook computer.

BACKGROUND OF THE INVENTION

In a notebook computer, the longevity of the liquid crystal display (or LCD) panel is not absolutely corresponding to the longevity of a central processing unit (or CPU) or the associated chipset used in the notebook computer. More specifically, the longevity of a CPU is averagely ranged between one-and-half year to two years, whereas the longevity of a LCD panel is averagely ranged between four to five years. It is a common situation that when a user desires to upgrade the CPU incorporated in a notebook computer, the whole notebook computer has to be replaced and the LCD panel attached to the notebook computer will be discarded as well. Accordingly, it is not possible to make the best of the LCD panel with a longer longevity from the past experience.

In addition, with the advancement of wireless communication technique, the LCD panel is able to communicate with the host of a computer in a wireless communication fashion. The user only needs to take a light and portable LCD panel instead of a notebook computer in its entirety. Further, because the LCD panel is able to operate independently of the host, it can be expanded to build a personalized multimedia music center product.

In a contemporary desktop computer, there has been achieved a replaceable LCD panel or a LCD display serving to operate independently of a desktop computer that is derived by taking the LCD panel apart from a desktop computer and mounted on a base. Nonetheless, the disassembling/assembling process of these types of LCD panel as described above requires to dismantle accessories and screws thereof, which is incapable of facilitating the disassembling/assembling operation of a LCD panel.

However, there has not been proposed a sample of a LCD panel of a notebook computer that can be independently dismantled from a notebook computer.

SUMMARY OF THE INVENTION

In view of the foregoing, the primary object of the present invention is to provide a LCD panel and a notebook computer incorporating the same, wherein the LCD panel can be rapidly assembled with/disassembled from a notebook computer and used independently of the rest of the notebook computer.

To this end, the present invention addresses a LCD panel including a LCD panel body, a rotating assembly, and a connecting unit, wherein the rotating assembly is rotatably attached to the LCD panel body and the connecting unit is mounted on the rotating assembly and exposed to an exterior of the rotating assembly.

Another aspect of the present invention provides a notebook computer including a host, a rotating assembly and a display panel body. The host is provided with a first connecting unit, and the rotating assembly is detachably positioned on the host and having a second connecting unit corresponding to the first connecting unit. The rotating assembly is electrically engaged with the host by the electric connection between the first connecting unit and the second connecting unit, and the display panel body is rotatably connected with the rotating assembly.

In a preferred embodiment, the host is further provided with at least one first latching assembly and the rotating assembly is provided with at least one corresponding second latching assembly. The rotating assembly can be positioned on the host by the latching engagement between the first latching assembly and the second latching assembly.

Further, the first latching assembly includes an engaging member, a shifting member, and an elastic member. The engaging member is movably mounted within the host and engages with the second latching assembly of the rotating assembly to be positioned on the host. The shifting member is movably mounted on the host and connected with the engaging member to drive the engaging member to move. The elastic member is resistively engaged with the engaging member and mounted within the host for providing a restoration force for the engaging member.

It can be realized that the elastic member is implemented with a spring and the second latching assembly is implemented with a protuberance integrally formed on the rotating assembly.

In another embodiment, at least one guiding rail is mounted on the host and at least one corresponding guiding groove is mounted on the rotating assembly. The rotating assembly can be guided to be positioned on the host by the cooperation of the guiding rail and guiding groove.

In another embodiment, the first connecting unit is provided with a plurality of contact terminals each of which is implemented in the form of an elastic piece.

In another embodiment, the second connecting unit is provided with a plurality of contact terminals each of which is implemented in the form of an elastic piece.

Another aspect of the present invention provides an electronic device including a base, a rotating assembly, and a display panel body. The base includes a first connecting unit, and the rotating assembly is detachably mounted on the base and having a second connecting unit exposed to an exterior of the rotating assembly. The second connecting unit is corresponding to the first connecting unit and the rotating assembly is attached to the base by the electric connection between the first connecting unit and the second connecting unit, and the display panel is rotatably connected with the rotating assembly.

The other objects, features and advantages will be become apparent through the following descriptions of preferred embodiment with reference to the drawings attached therewith, wherein:

DETAILED DESCRIPTION OF THE PREFERRED EMBODIMENTS

Figure 1A:
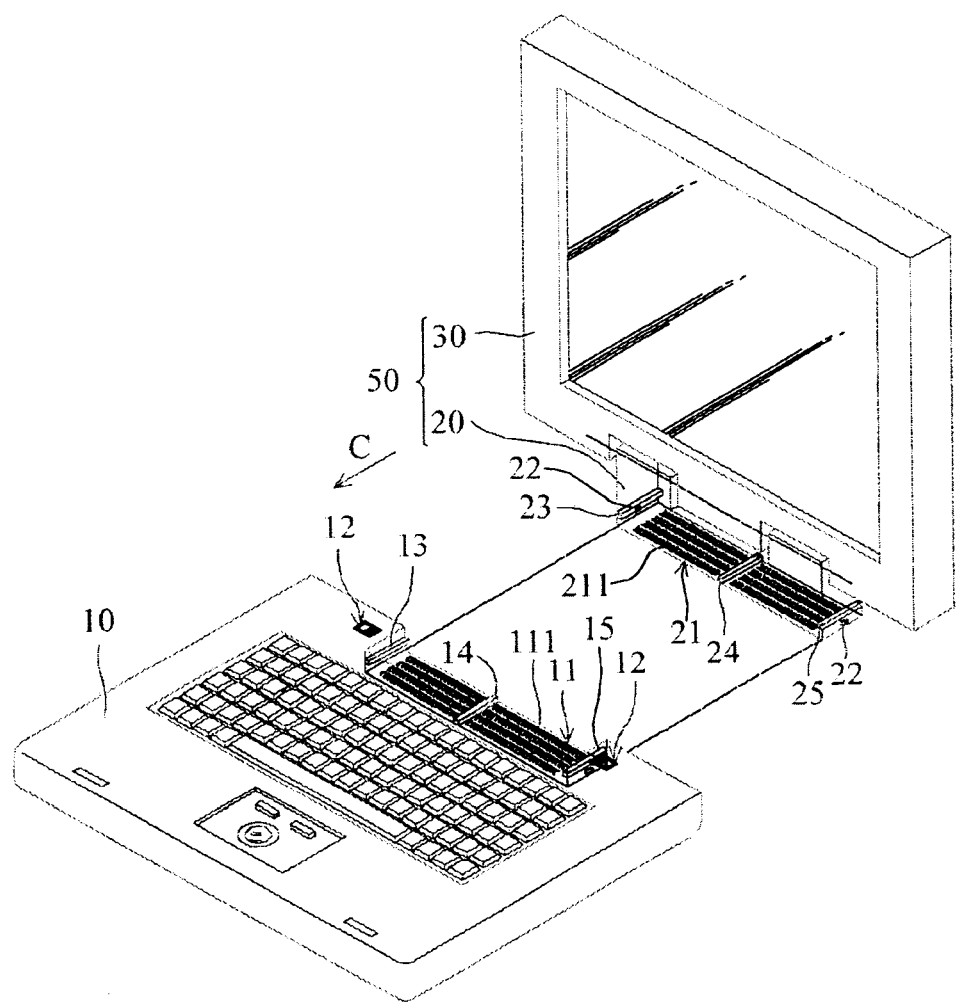
FIG. 1a is an exploded view of a notebook computer according to a preferred embodiment of the present invention.
Figure 1B:
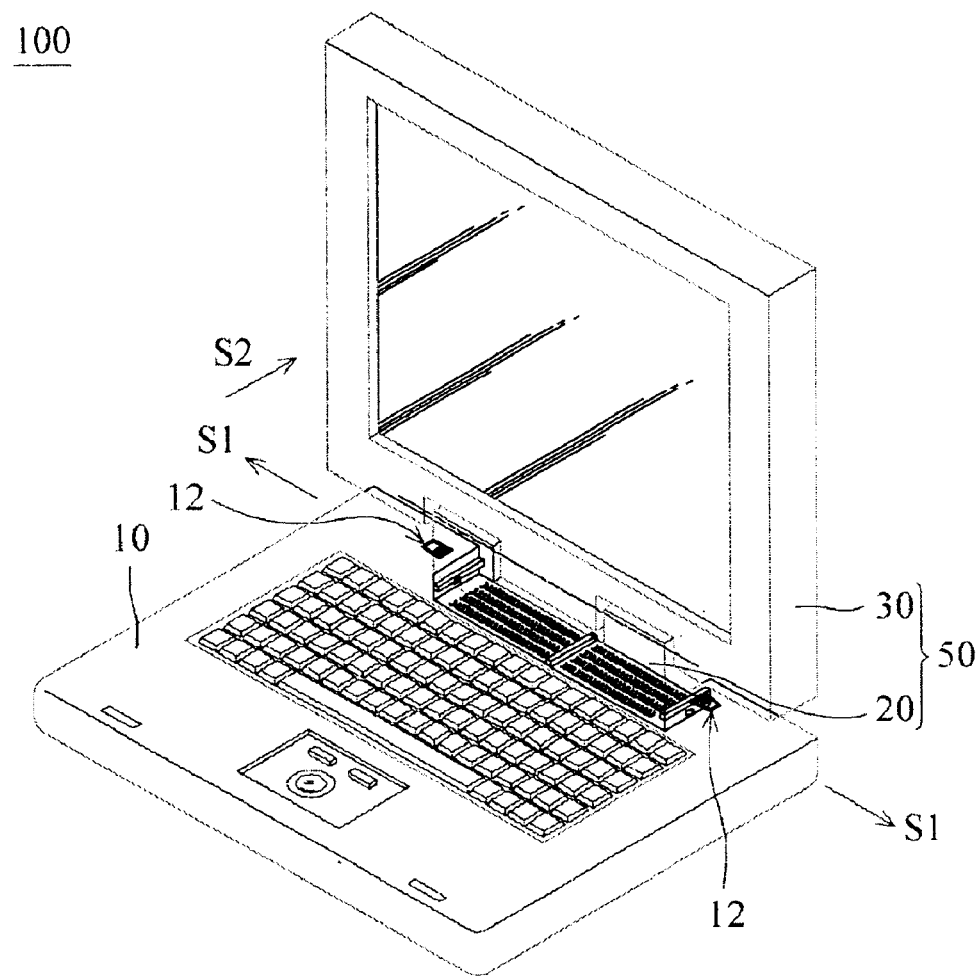
FIG. 1b is a schematic view showing a notebook computer assembled with a LCD panel shown in FIG. 1a according to a preferred embodiment of the present invention.

Referring to FIGS. 1a and 1b which show a LCD panel 50 and a notebook computer 100 incorporating the same according to a preferred embodiment of the present invention, wherein the notebook computer 100 includes a host 10, a rotating assembling 20, and a display panel body 30, and both the rotating assembly 20 and the display panel body 30 constitute the LCD panel 50 according to the present invention.

An internal constitution of the host 10 is similar to a conventional notebook computer, and a detailed description for which will be omitted herein. The host 10 is provided with a first connecting unit 11, two first latching assemblies 12 (their internal constitutions may be realized in reference to FIG. 2a and will be described later), and three guiding rails 13, 14 and 15 that are mounted on a surface of the host 10 facing to the rotating assembly 20 and respectively mates with the guiding rails 23, 24 and 25 of the rotating assembly 20 for guiding the rotating assembly 20 to be coupled with the host 10 smoothly. The description of the guiding rails 23, 24 and 25 of the rotating assembly 20 will be given in the following.

The first connecting unit 11 is mounted on a surface of the host 10 facing to the rotating assembly 20, and it will electrically connect with the second connecting unit 21 so that the electric signals from the host 10 and the display panel body 30 can be transmitted by the rotating assembly 20. Also, the first connecting unit 11 is provided with a plurality of contact terminals 111. It is to be understood that the contact terminals 111 can be preferably formed with elastic members, in order to ensure a more rigid connection between the first connecting unit 11 and the second connecting unit 21.

Figure 2A:
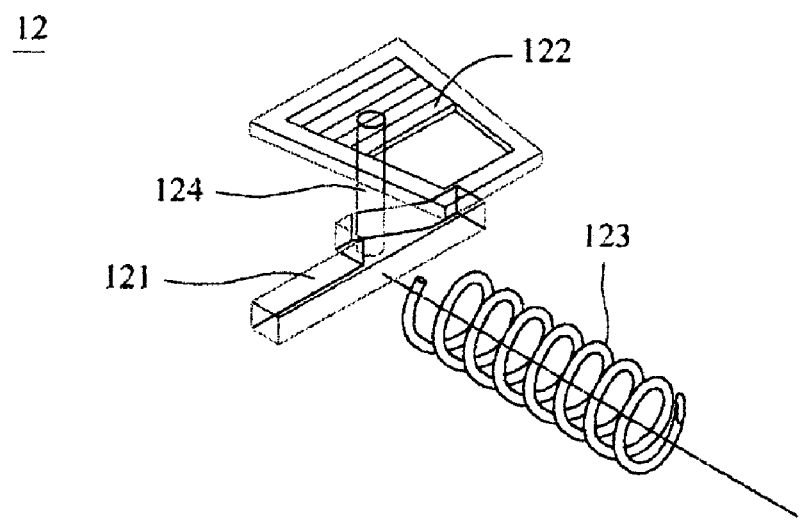
FIG. 2a showing an internal constitution of a first latching assembly indicated in FIG. 1a according to a preferred embodiment of the present invention.
Figure 2B:
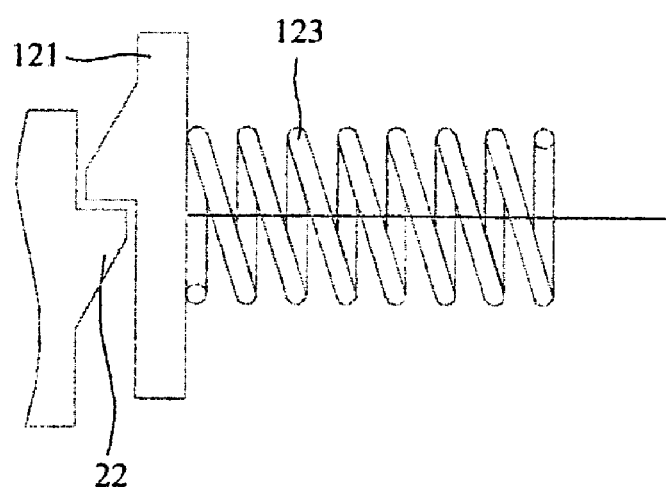
FIG. 2b is an illustrative diagram showing that a first latching assembly and a second latching assembly indicated in FIG. 1a being engaged with each other according to a preferred embodiment of the present invention.

Two first latching assemblies 12 are respectively mounted on the both sides of the host 10, and includes an engaging member 121, a moveable member 122 and an elastic member 123 as shown in FIG. 2a, wherein the engaging member 121 is movably mounted within the host 10 and can be locked with the second latching assembly 22 of the rotating assembly 20 as shown in FIG. 2b, which will be described hereinafter. The shifting member 122 can be directed to an operation pushbutton and is movably mounted on the host 10 to drive the engaging member 121 to move by the connection with the engaging member 121 through a connecting member 124. The elastic member 123 is mounted in the host 10 by resistively engaging with the engaging member 121, so as to provide restoration force for the engaging member 121 to allow the engaging member 121 to restore to its original position once the external force applied to the engaged member 121 is removed.

It should be noted that the elastic member 123 can be implemented with a spring and can be removed from the first latching assembly 12. If the elastic member 123 is not mounted, the movement of the engaging member 121 has be to driven by the shifting member 122 completely.

The rotating assembly 20 is detachably positioned on the host 10 and includes a second connecting unit 21, two second latching assemblies 22, and three guiding grooves 23, 24 and 25 affixed thereon. The second connecting unit 21 is mounted on a surface of the rotating assembly 20 facing the host 10, that is, the second connecting unit is mounted so as to be exposed to an exterior of the rotating assembly 20, and mates with the first connecting unit 11 of the host 10. The rotating assembly 20 can be electrically connected with the host 10 by the electric connection between the first connecting unit 11 and the second connecting unit 21.

The second connecting unit 21 is provided with a plurality of second contact terminals 211. It should be noted that the second contact terminals 211 can be preferably formed with elastic members in order to ensure a more rigid connection between the first connecting unit 11 and the second connecting unit 21. Also, it should be noted that the first contact terminals 111 and the second contact terminals 121 are not restrictively manufactured in a form of elastic members, but it is necessary that at least one of the them is manufactured in the form of elastic members.

Besides, the first connecting unit 11 and the second connecting unit 21 are not restricted to the forms described above. They may be directed a male connector and a female matching with each other. Because the forms of such connectors are well-known to those skilled in the art, it is not intended to give more details herein.

Figure 1C:
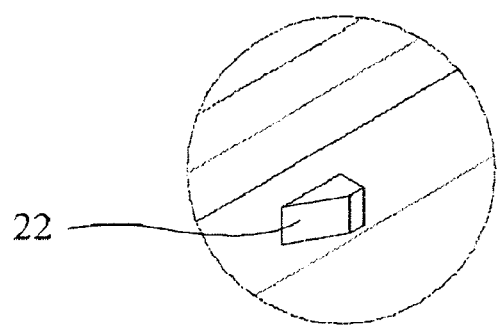
FIG. 1c is a structurally amplified view of a second latching assembly indicated in FIG. 1a according to a preferred embodiment of the present invention.

Two second latching assemblies 22 are respectively arranged on both sides of the rotating assembly 20, and as shown in FIG. 1c, it can be a protuberance integrally formed on the rotating assembly 20. Therefore when the rotating assembly 20 is desired to connected with the host 10, the engaging member 121 of the first latching assembly 12 is engaged with the second latching assembly 22 such that the rotating assembly 20 is positioned on the host 10.

Guiding grooves 23, 24 and 25 are respectively arranged on a left side, a central section and a right side of the rotating assembly 20, and respectively mates with the guiding rails 13, 14 and 15 formed on the host 10. With the cooperation of the guiding grooves 23, 24 and 25 as well as the guiding rails 13, 14 and 15, the rotating assembly 20 can be smoothly guided and positioned onto the host 10.

The display panel body 30 can a common display panel of a notebook computer, and is rotatably connected with the rotating assembly 20.

The constitution of the notebook computer 100 according to the present invention has been fully described as above, here the assembling/disassembling operation of the notebook computer 100 will be discussed as follows.

When the LCD panel 50 of the notebook computer 100 shown in FIG. 1b is desired to take apart from the host 10, a user only needs to depressively thrust the shifting member 122 of the first latching assembly 12 along the arrowhead direction s1 as indicated in FIG. 1b, such that the engaging member 121 of the first latching assembly 12 separates from the second latching assembly 22. In this way, the LCD panel 50 is able to move along the arrowhead direction s2 as indicated in FIG. 1b, and thus the LCD panel 50 and host 10 can be separated as shown in FIG. 1a.

If it is desired to combine the LCD panel 50 and host 10 together, as long as the guiding grooves 23, 24 and 25 of the rotating assembly 20 being aligned with the guiding rails 13, 14 and 15 and the LCD panel 50 is pushed along the arrowhead direction C as indicated in FIG. 1a toward the host 10 until the engaging member 121 of the first latching assembly 12 is fastened with the second latching assembly 22, the LCD panel 50 is positioned on the host 10 thereby.

It is envisaged that the LCD panel 50 in the notebook computer 100 according to the present invention can be replaced under a convenient condition without the need of dismantling any accessories or screws.

Figure 3:
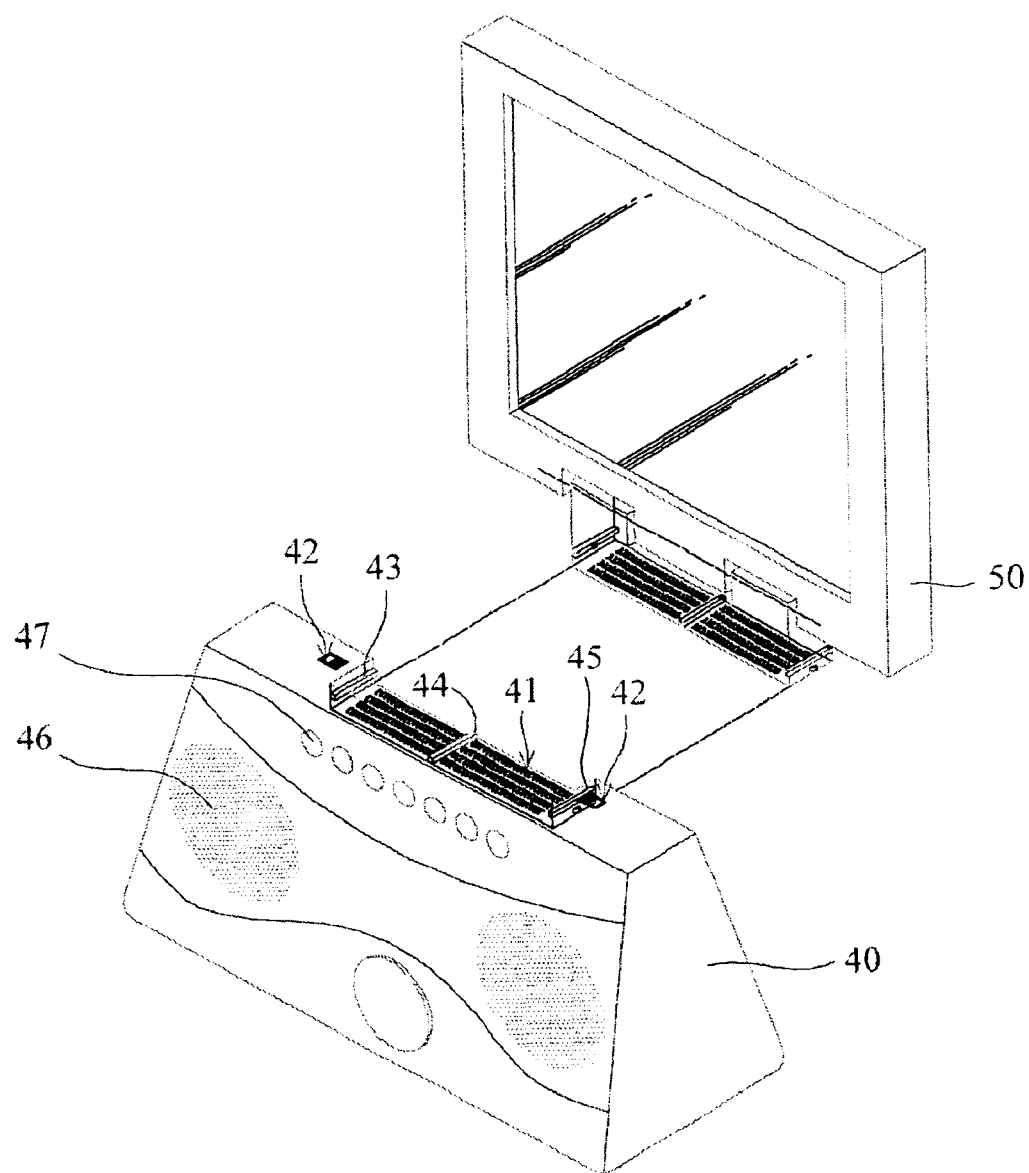
FIG. 3 is a schematic view illustrating a LCD panel to be mounted on a base of an electronic device according to the present invention.

When the LCD panel 50 is dismantled from the notebook computer 100, it can be positioned on a cooperating base and form an operatively independent electronic device. Referring to FIG. 3, the reference number indicating a constituting component that is similar to the reference numeral shown in FIG. 1 is directed to the same constituting component of FIG. 1. The electronic device 200 as shown in FIG. 3 includes a base 40 and a LCD panel 50. The base 40 is provided with a first connecting unit 41, two first latching assemblies 42, and three guiding rails 43, 44 and 45. The LCD panel 50 can be detachably combined with the base 40 accordingly and serves as the display screen of the electronic device 200.

For example, speaker 46 and pushbutton 47 can be mounted on the base 40, and thereby the electronic device 200 can serve as a personalize audio/video entertainment equipment.

Although the present invention has been described and illustrated in detail, it is to be clearly understood that the same is by the way of illustration and example only and is not to be taken by way of limitation, the spirit and scope of the present invention being limited only by the terms of the appended claims.

What is claimed is:

1. A liquid crystal display panel comprising:
   a liquid crystal display panel body;
   a rotating assembly;
   a connecting unit attached to the rotating assembly and exposed to an exterior of the rotating assembly, wherein the connecting unit includes a plurality of contact terminals each of which is implemented with an elastic piece.

2. A notebook computer comprising:
   a host having a first connecting unit, the host comprising at least one first latching assembly, the first latching assembly comprising:
      an engaging member movably mounted within the host; and
      a shifting member movably mounted on the host and connected with the engaging member for driving the engaging member to move;
   a rotating assembly detachably positioned on the host and having an exposed second connecting unit, wherein the second connecting unit is corresponding to the first connecting unit, and an electric connection between the rotating assembly and the host is achieved by an electric engagement between the first connecting unit and the second connecting unit, the rotating assembly comprising at least one second latching assembly, and the rotating assembly being positioned on the host by a latching engagement between the engaging member of the first latching assembly and the second latching assembly; and
   a liquid display body rotatably connected with the rotating assembly.

3. The notebook computer of claim 2 wherein the first latching assembly further comprises:
   an elastic member mounted within the host by resistively engaging with the engaging member for providing a restoration force for the engaging member; and
   a connecting member connected between the engaging member and the shifting member.

4. The notebook computer of claim 3 wherein the elastic member is a spring.

5. The notebook computer of claim 2 wherein the second latching assembly is a protuberance integrally formed on the rotating assembly.

6. The notebook computer of claim 2 wherein at least one guiding rail is mounted on the host and at least one guiding groove is mounted on the rotating assembly correspondingly to the guiding rail, and the rotating assembly is guided to be positioned on the host by a cooperation of the guiding rail and the guiding groove.

7. The notebook computer of claim 2 wherein the first connecting unit is provided with a plurality of contact terminals each of which is respectively formed from an elastic piece.

8. The notebook computer of claim 2 wherein the second connecting unit is provided with a plurality of contact terminals each of which is respectively formed from an elastic piece.

9. An electronic device comprising:
   a base having a first connecting unit thereon, the base comprising at least one first latching assembly, the first latching assembly comprising:
      an engaging member movably mounted within the base; and
      a shifting member movably mounted on the base and engaged with the engaging member for driving the engaging member to move;
   a rotating assembly detachably connected with the base and having a second connecting unit exposed to an exterior of the rotating assembly, the second connecting unit is corresponding to the first connecting unit and the rotating assembly is electrically connected with the base by an electric connection between the first connecting unit and the second connecting unit, the rotating assembly comprising at least one second latching assembly, a connection between the rotating assembly and the base being achieved by a latching engagement between the engaging member of the first latching assembly and the second latching assembly; and
   a display panel body rotatably connected with the rotating assembly.

10. The electronic device of claim 9 wherein the first latching assembly further includes:
    an elastic member mounted within the base by resistively engaging with the engaging member for providing a restoration force for the engaging member; and
    a connecting member connected with between engaging member and the shifting member.

11. The electronic device of claim 10 wherein the elastic member is a spring.

12. The electronic device of claim 9 wherein the second latching assembly is a protuberance integrally formed on the rotating assembly.

13. The electronic device of claim 9 wherein at least one guiding rail is mounted on the base and at least one guiding groove is mounted on the rotating assembly correspondingly to the guiding rail, and the rotating assembly is guided to be positioned on the base by a cooperation of the guiding rail and the guiding groove.

14. The electronic device of claim 9 wherein the first connecting unit includes a plurality of contact terminals each of which is implemented with an elastic piece.

15. The electronic device of claim 9 wherein the second connecting unit includes a plurality of contact terminals each of which is implemented with an elastic piece.

* * * * *